US012015891B1

(12) United States Patent
Gage

(10) Patent No.: US 12,015,891 B1
(45) Date of Patent: Jun. 18, 2024

(54) ADJUSTABLE OVER-EAR HEADPHONE CUSHIONS TO ACCOMMODATE EYEWEAR FRAMES

(71) Applicant: Sydney Larissa Gage, Brighton, CO (US)

(72) Inventor: Sydney Larissa Gage, Brighton, CO (US)

( * ) Notice: Subject to any disclaimer, the term of this patent is extended or adjusted under 35 U.S.C. 154(b) by 122 days.

(21) Appl. No.: 17/871,986

(22) Filed: Jul. 25, 2022

Related U.S. Application Data

(60) Provisional application No. 63/224,754, filed on Jul. 22, 2021.

(51) Int. Cl.
*H04R 1/10* (2006.01)

(52) U.S. Cl.
CPC ......... *H04R 1/1008* (2013.01); *H04R 1/1058* (2013.01)

(58) Field of Classification Search
CPC .. H04R 1/1008; H04R 1/1058; H04R 1/1075; G02C 5/143
See application file for complete search history.

(56) References Cited

U.S. PATENT DOCUMENTS 5,519,783 A * 5/1996 Kumar ................. H04R 1/1008 181/129

FOREIGN PATENT DOCUMENTS

KR 2093933 B1 * 3/2020 ............. G02C 11/10

* cited by examiner

*Primary Examiner* — Sunita Joshi
(74) *Attorney, Agent, or Firm* — Plager Schack LLP; Mark H. Plager; Kara K. Verryt

(57) ABSTRACT

An adjustable over-ear headphone cushion for comfortably accommodating eyewear frames without losing sound quality may include an upper cushion and a lower cushion attached to the upper cushion with a ratcheting system. The upper cushion and the lower cushion may be vertically adjusted with respect to one another from a mated configuration to a spaced apart configuration, and the upper cushion and the lower cushion together form a substantially O-shaped headphone cushion configured to be removably attached to a headphone.

8 Claims, 4 Drawing Sheets

ADJUSTABLE OVER-EAR HEADPHONE CUSHIONS TO ACCOMMODATE EYEWEAR FRAMES

RELATED APPLICATION

This application claims priority to provisional patent application U.S. Ser. No. 63/224,754 filed on Jul. 22, 2021, the entire contents of which is herein incorporated by reference.

BACKGROUND

The embodiments described herein relate generally to headphones and, more particularly, to an over-ear headphone cushion designed to accommodate eyewear frames.

Existing over-ear headphone cushions cannot be comfortable used with eyewear frames. Rather, the existing cushions place pressure on the eyewear temples, thus pressing them into the user's head, causing discomfort for the user.

Therefore, what is needed is an over-ear headphone cushion that is adjustable to allow for eyewear frames, and particularly the temples, to sit on the user without being pressed into the head while simultaneously preventing loss of sound quality and experience.

SUMMARY

Some embodiments of the present disclosure include an adjustable over-ear headphone cushion for comfortably accommodating eyewear frames without losing sound quality. The headphone cushion may include an upper cushion and a lower cushion attached to the upper cushion with a ratcheting system. The upper cushion and the lower cushion may be vertically adjusted with respect to one another from a mated configuration to a spaced apart configuration, and the upper cushion and the lower cushion together form a substantially O-shaped headphone cushion configured to be removably attached to a headphone.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as headphone cushions that accommodate eyewear frames and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-7, some embodiments of the present disclosure include an adjustable over-ear headphone cushion for comfortable accommodating eyewear frames without losing sound quality, the over-ear headphone cushion comprising a pair of half cushions attached to one another via a ratcheting system, such that the half cushions can be vertically adjusted with respect to one another.

Figure 3:
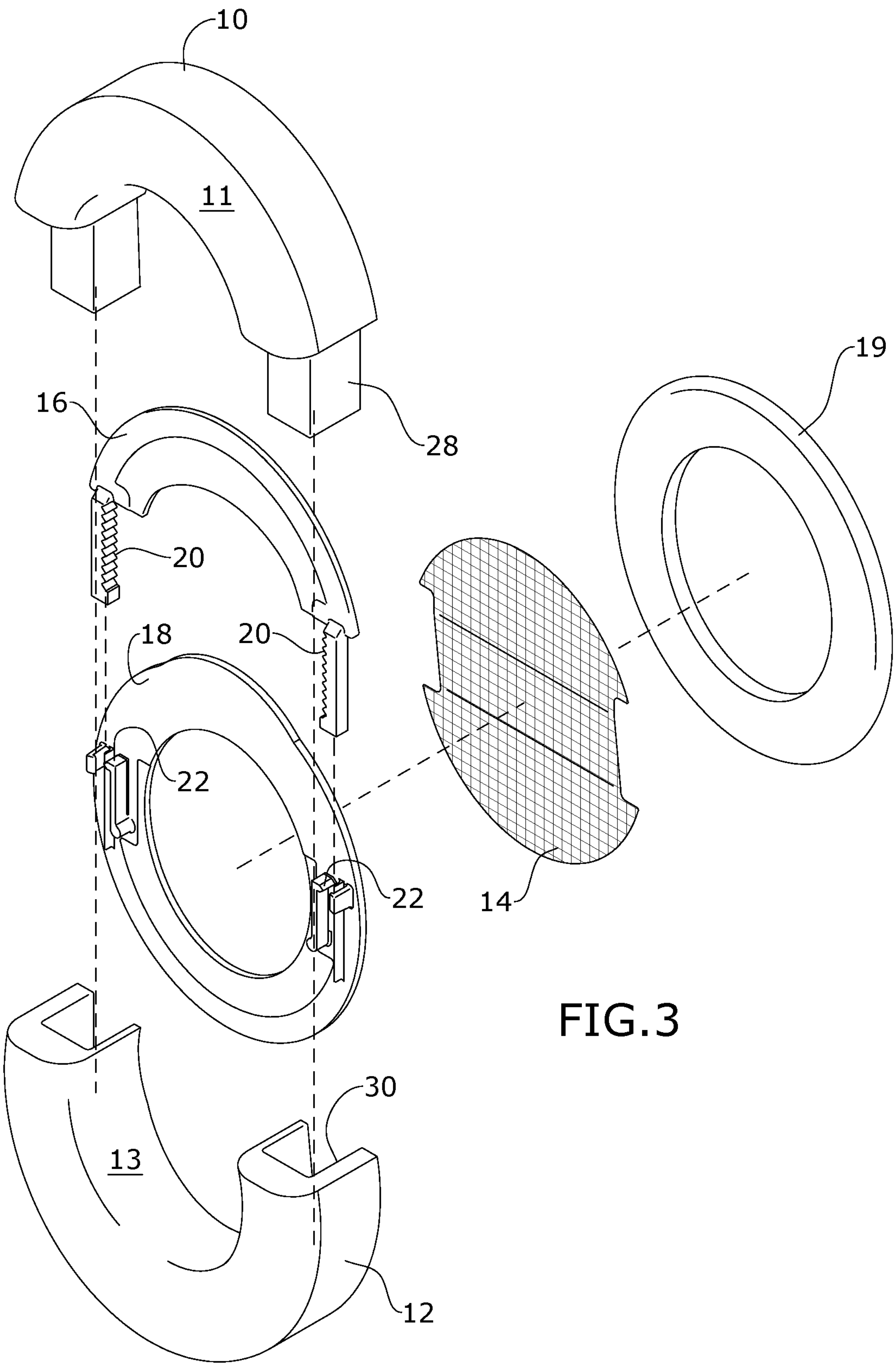
FIG. 3 is an exploded view of one embodiment of the present disclosure.

More specifically, and as shown in the Figures, the pair of half cushions may comprise an upper cushion 10, such as an upper substantially U-shaped cushion, and a lower cushion 12, such as a lower substantially U-shaped cushion. As such, the upper cushion 10 may comprise a pair of bottom edges, and the lower cushion 12 may comprise a pair of upper edges, wherein the bottom edges of the upper cushion 10 may be designed to align with the upper edges of the lower cushion 12 to form a substantially O-shaped cushion with an inner opening, wherein the inner opening may include a protector 14, such as a stretchable mesh lining attached therein. More specifically, as shown in FIG. 3, the bottom edges of the upper cushion 10 may each comprise an upper cushion protrusion 28, and the upper edges of the lower cushion 12 may each comprise a lower cushion slot 30 shaped to accept insertion of the upper cushion protrusions 28 therein. In a particular example, each of the upper cushion protrusions 28 may be substantially rectangular shaped cubes, and each of the lower cushion slots 30 may be substantially rectangular shaped slots.

Figure 1:
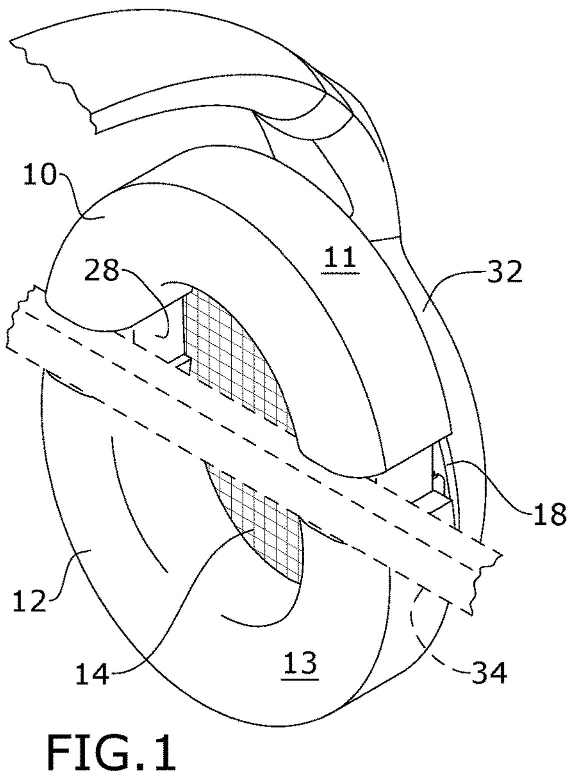
FIG. 1 is a perspective view of one embodiment of the present disclosure, shown with exemplary headphones 32.
Figure 2:
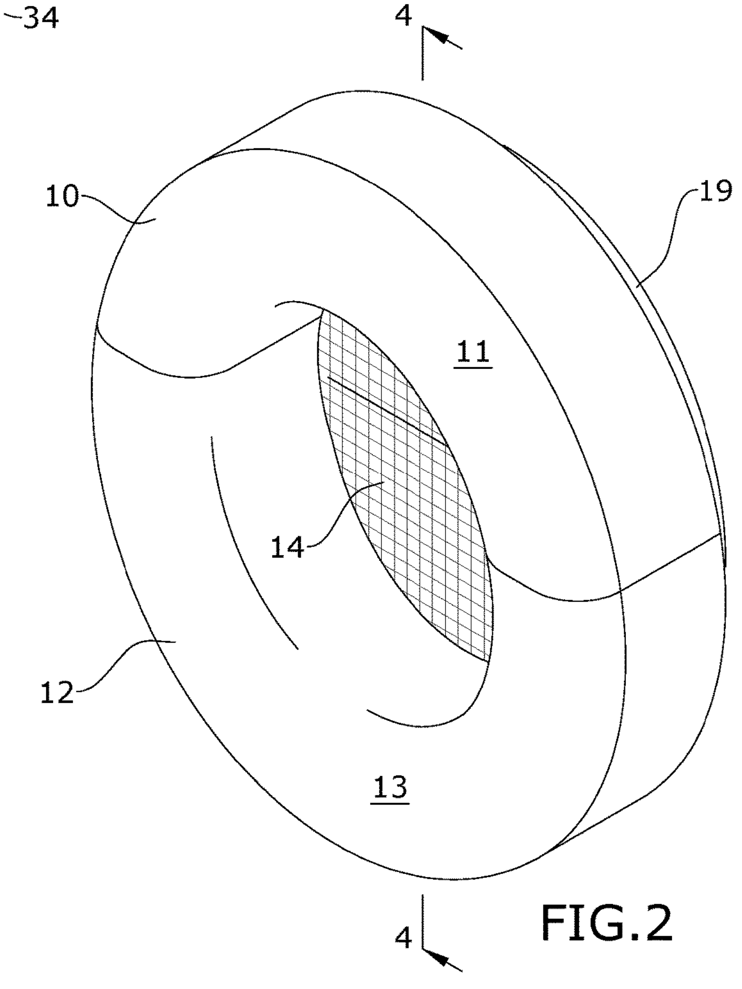
FIG. 2 is a perspective view of one embodiment of the present disclosure.

As shown in FIG. 3, embodiments of the headphone cushion may further comprise a casing 18 attached to a rear surface of the pair of half cushions. The casing 18 may comprise, for example, a rigid plastic casing with a click-in structure compatible with modern headphones to allow for use of the headphone cushion of the present disclosure with any existing headphones 32. More specifically, the casing 18 may be fixedly attached to the lower cushion 12 and slidably attached to the upper cushion 10. For example, and as shown in the Figures, a sliding base 16 may be operatively attached to a rear surface of the upper cushion 10, wherein the sliding base comprises a U-shaped base, wherein each end of the U-shape comprises a pinion 20 with a plurality of sliding base teeth. The sliding base 16 may be adjustably attached to the casing 18. For example, the casing 18 may comprise a pair of ratcheting devices 22 designed to adjustably engage with the pinions 20. More specifically, the ratcheting device 22 may include a ratcheting arm with a tooth designed to engage with the sliding base teeth and a guide track 21 designed to maintain alignment of pinion 20. In embodiments, if the upper cushion 10 is closed with respect to the lower cushion 12, as shown in FIG. 2, the cushions 10, 12 may be in a mated configuration and the ratcheting arm may engage with a base tooth at a proximal end of the pinion 20. On the other hand, if the upper cushion 10 is opened with respect to the lower cushion 12, as shown in FIG. 1, the cushions 10, 12 may be in a spaced apart configuration, a space between the cushions 10, 12 may be sufficient for accommodating an eyewear temple 34 there between, and the ratcheting arm may engage with a base tooth at a distal end of the pinion 20. In fact, the ratcheting system may allow for the upper cushion 10 to be adjusted incrementally with respect to the lower cushion 12 without the upper cushion 10 being completed unattached from the lower cushion 12, thus providing a space there between suitable for eyewear temples 34 with varying sizes. While the above includes a description that it is the upper cushion 10 that is attached to a sliding base 16, it is to be understood that it may the lower cushion 12 instead that is attached to a sliding base.

As shown in FIGS. 2-5, the headphone cushion of the present disclosure may further comprise a headphone connector 19 mounted to a rear surface of the casing 18. In embodiments, the protector 14 may be sandwiched between the headphone connector 19 and the casing 18. The headphone connector 19 may comprise a flexible, soft material and may function to attach the headphone cushion to a user's pre-existing headphones. In some embodiments, the pinion 20 and the sliding base 16 may be a singular piece that is covered by upper cushion protrusion 28. When the sliding base guides are formed as one piece connected to casing 18, vertical stabilization of the pinion 20 is provided for while the user extends the upper piece for space adjustment for the eyewear temple 34. When the sliding base guides are covered by pinion 20 while the cushions are fully closed, the device can be used without eyewear. When the cushion is fully open, a track 21 is exposed from the pinion 20 but not shown to a user as cushion 10 provides an open tunnel for sliding of the upper piece that covers the inner rack and pinion 20.

In alternate embodiments, other ratcheting systems may be used, so long as the upper cushion 10 is capable of being spaced from lower cushion 12 and secured in the desired position. For example, in an alternative embodiment (not shown), the ratcheting system may comprise a ratcheting system that extends from one of the cushions, across a mating area of the cushions, and to the other cushion. Yet further embodiments may include multiple ratcheting connections positioned between the casing 18 and the back surface of each of the cushions 10, 12, wherein each of the ratcheting connections may include a pull and click locking mechanism designed to adjust the distance between the upper cushion 10 and the lower cushion 12 from about 0 mm to about 20 mm, wherein each incremental adjustment may be, for example, about 2 mm.

Figure 4:
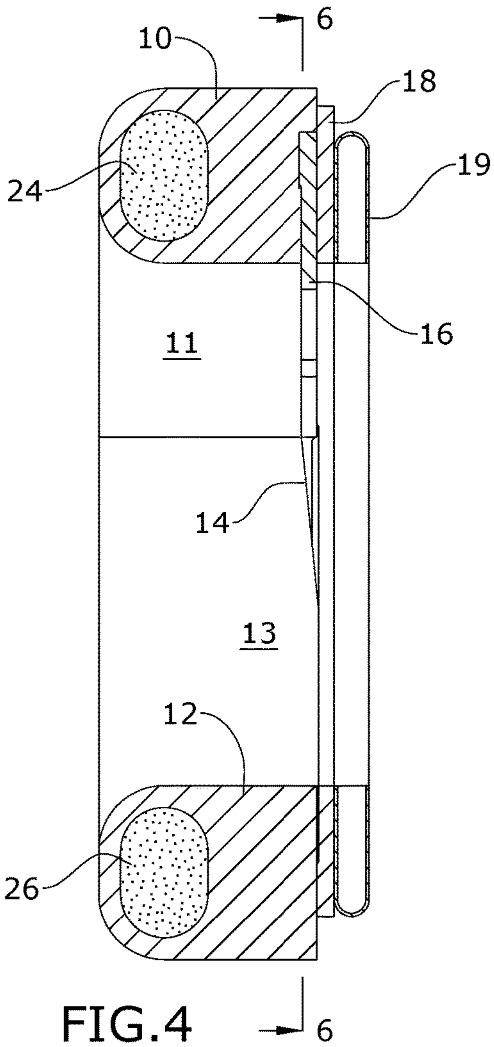
FIG. 4 is a section view of one embodiment of the present disclosure, taken along line 4-4 in FIG. 2.
Figure 5:
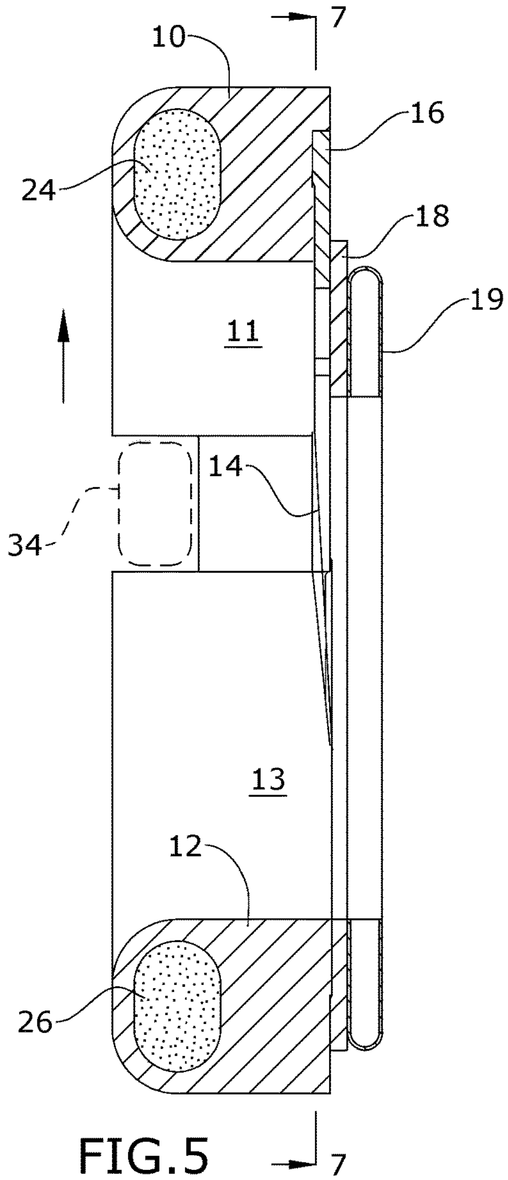
FIG. 5 is a section view of one embodiment of the present disclosure, showing motion of the upper cushion 10.
Figure 6:
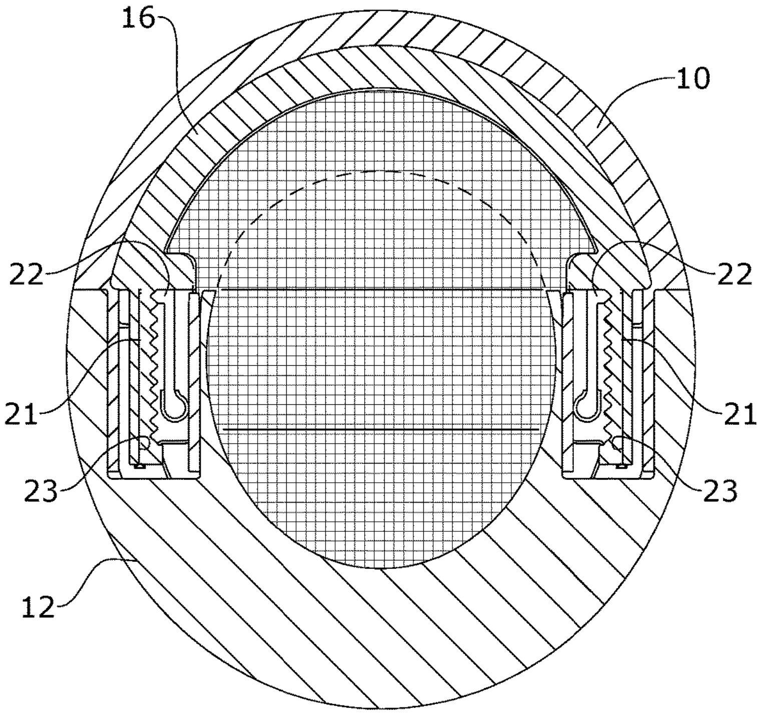
FIG. 6 is a section view of one embodiment of the present disclosure, taken along line 6-6 in FIG. 4.
Figure 7:
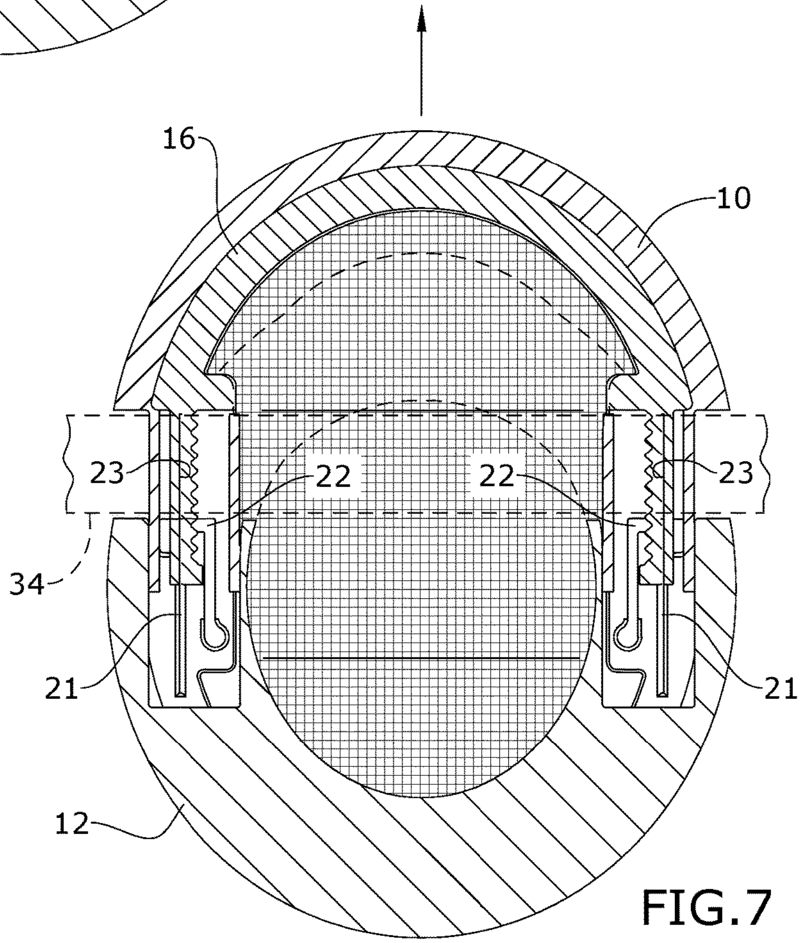
FIG. 7 is a section view of one embodiment of the present disclosure, taken along line 7-7 in FIG. 5 and showing motion of the upper cushion 10.

The device of the present disclosure may be made of any suitable or desired materials. For example, in a particular embodiment, the upper cushion 10 may comprise an upper gel core 24 encased within the upper cushion material, as shown in FIG. 4. Similarly, the lower cushion 12 may comprise a lower gel core 26 encased within the lower cushion material. The upper cushion 10 may comprise an upper cushion cover 11 encasing the upper cushion material, and the lower cushion 12 may comprise a lower cushion cover 13 encasing the lower cushion material. More specifically, each of the upper cushion material and the lower cushion material may comprise a breathable, moisture-wicking fabric covered foam cushioning or a polyurethane leather covered foam cushioning. However, the use of other cushion materials is envisioned.

To use the headphone cushion of the present disclosure once attached to a pair of headphones 32, the user may either use the cushion in a closed configuration, as shown in FIG. 2, if for, example, the user is not wearing eyewear. If the user is wearing eyewear, the user may adjust the upper cushion 10 with respect to the lower cushion 12 using the ratcheting system to provide a space between the upper cushion 10 and the lower cushion 12, wherein the space is sufficient for accommodating an eyewear temple 34 therein. The headphone cushions may be used in any desired environment, such as for gaming, for music, as ear protection, as personal protection equipment, in an office, and the like. To create the open and closed configuration (vertical movement) of cushion 10, pinion 20, which slides uniformly on track 21, clicks into a rack in spacing increments of about 2 mm.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. An adjustable over-ear headphone cushion for comfortably accommodating eyewear frames without losing sound quality, the over-ear headphone cushion comprising:
- an upper cushion;
- a lower cushion attached to the upper cushion with a ratcheting system; and
- a casing operatively attached to a rear surface of both the upper cushion and the lower cushion,
- wherein:
  - the upper cushion and the lower cushion are vertically adjustable with respect to one another from a mated configuration to a spaced apart configuration;
  - the upper cushion and the lower cushion together form a substantially O-shaped headphone cushion configured to be removably attached to a headphone;
  - the casing is fixedly attached to the rear surface of the lower cushion;
  - a sliding base is attached to the rear surface of the upper cushion; and
  - the sliding base is slidably engaged with the casing.

2. The adjustable headphone cushion of claim 1, wherein:
- the upper cushion comprises a substantially U-shaped cushion with a pair of bottom edges;
- the lower cushion comprises a substantially U-shaped cushion with a pair of upper edges;
- the pair of bottom edges each include an upper cushion protrusion extending therefrom; and
- the pair of lower edges each include a lower cushion slot sized to accommodate insertion of the upper cushion protrusion therein.

3. The adjustable headphone cushion of claim 1, wherein:
- the sliding base includes a pinion with a plurality of sliding base teeth; and
- the casing comprises a ratcheting device designed to adjustable engage with the pinion.

4. The adjustable headphone cushion of claim 3, wherein the ratcheting device comprises a ratcheting arm with a tooth designed to incrementally engage with the sliding base teeth.

5. The adjustable headphone cushion of claim 4, wherein:
- the ratcheting arm incrementally engages with the sliding base teeth such that the upper cushion is designed to adjust, with respect to the lower cushion, from the mated configuration with about 0 mm of space between the upper cushion and the lower cushion to a spaced apart configuration with about 20 mm of space between the upper cushion and the lower cushion.

6. The adjustable headphone cushion of claim 5, wherein each increment of adjustment is about 2 mm.

7. An adjustable over-ear headphone cushion for comfortably accommodating eyewear frames without losing sound quality, the over-ear headphone cushion comprising:
- an upper cushion comprising a substantially U-shaped cushion with a pair of bottom edges; and
- a lower cushion attached to the upper cushion with a ratcheting system, the lower cushion comprising a substantially U-shaped cushion with a pair of upper edges,
- wherein:
  - the upper cushion and the lower cushion are vertically adjustable with respect to one another from a mated configuration to a spaced apart configuration;
  - the upper cushion and the lower cushion together form a substantially O-shaped headphone cushion configured to be removably attached to a headphone;
  - the pair of bottom edges each include an upper cushion protrusion extending therefrom; and
  - the pair of lower edges each include a lower cushion slot sized to accommodate insertion of the upper cushion protrusion therein.

8. An adjustable over-ear headphone cushion for comfortably accommodating eyewear frames without losing sound quality, the over-ear headphone cushion comprising:
- an upper cushion;
- a lower cushion attached to the upper cushion with a ratcheting system; and
- a casing operatively attached to a rear surface of both the upper cushion and the lower cushion,
- wherein:
  - the upper cushion and the lower cushion are vertically adjustable with respect to one another from a mated configuration to a spaced apart configuration;
  - the upper cushion and the lower cushion together form a substantially O-shaped headphone cushion configured to be removably attached to a headphone; and
  - at least one of the upper cushion and the lower cushion is slidably attached to the casing.

* * * * *